UNITED STATES PATENT OFFICE.

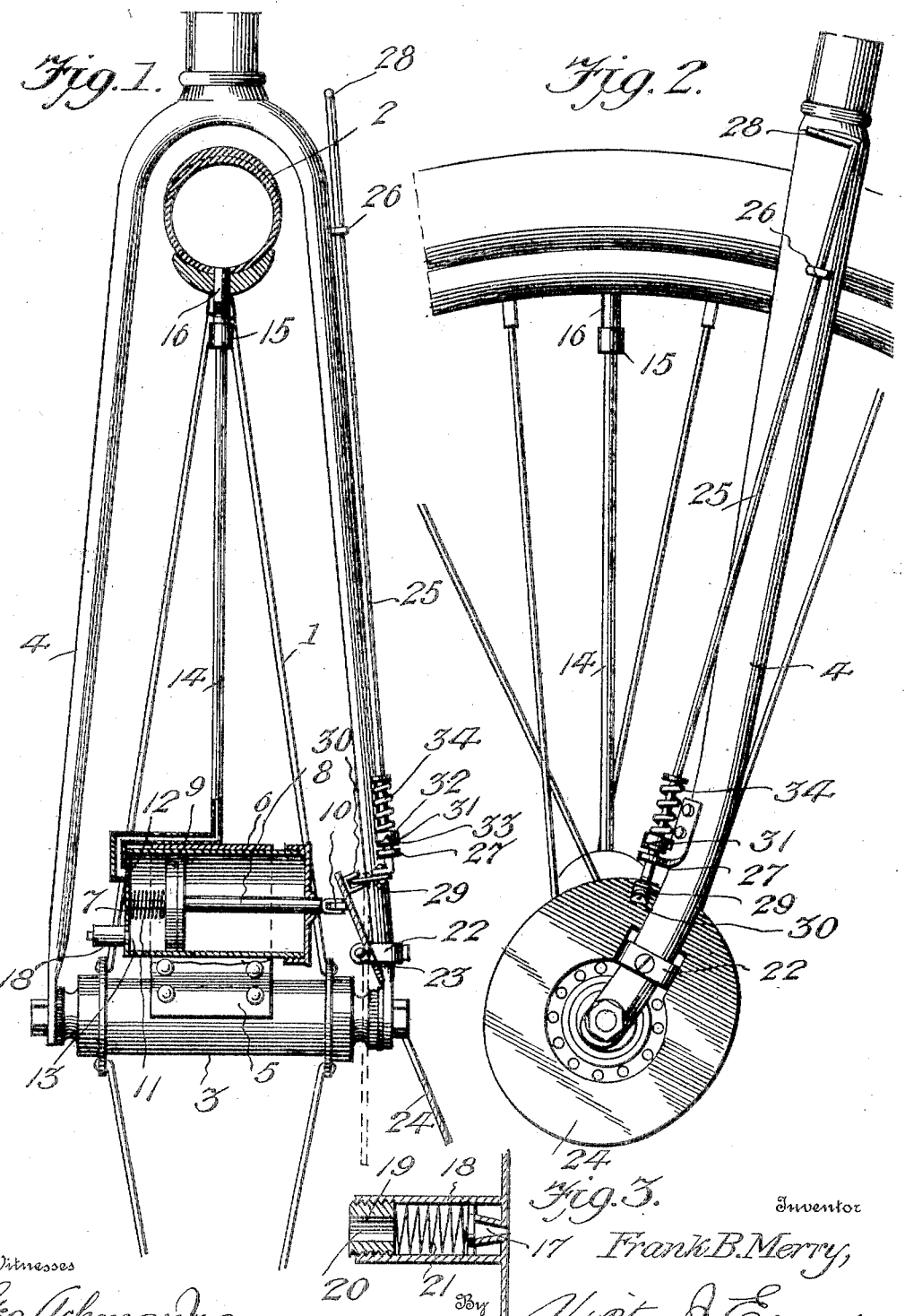

FRANK BRUCKNER MERRY, OF AUGUSTA, GEORGIA, ASSIGNOR OF ONE-HALF TO BRADFORD MERRY, OF AUGUSTA, GEORGIA.

BICYCLE-PUMP.

No. 797,447.        Specification of Letters Patent.        Patented Aug. 15, 1905.

Application filed September 17, 1904. Serial No. 224,919.

*To all whom it may concern:*

Be it known that I, FRANK BRUCKNER MERRY, a citizen of the United States, residing at 1444 Glover street, Augusta, in the county of Richmond and State of Georgia, have invented new and useful Improvements in Bicycle-Pumps, of which the following is a specification.

This invention relates to bicycle-pumps, and has for its objects to produce a comparatively simple inexpensive device of this character which may be readily applied to a bicycle or other vehicle and will in practice automatically inflate the tire during the travel of the vehicle over the ground and one wherein the pump may be readily thrown into and out of action.

A further object of the invention is to provide an improved safety-valve connected with the pump-cylinder, whereby after the tire has been properly inflated the air may automatically escape from the pump to thereby obviate bursting of the tire.

To these ends the invention comprises the novel features of construction and combination of parts more fully hereinafter described.

In the accompanying drawings, Figure 1 is a front elevation of a portion of a bicycle wheel and frame, showing my improved device applied thereto. Fig. 2 is a side elevation of the same. Fig. 3 is a detail sectional view of the safety-valve.

Referring to the drawings, 1 designates the front wheel of a bicycle equipped with a pneumatic tire 2 and having a hub 3 journaled for rotation in a fork or frame 4. These parts may all be of the usual or any appropriate construction, inasmuch as they constitute no part of my invention.

Fixed to the hub 3 by means of a clip 5 or in any other suitable manner is a pump-cylinder 6, having therein a central longitudinal guide-rod 7, upon which slides the tubular plunger or piston-rod 8, equipped at one end within the cylinder with a piston-head 9 and at its outer end with an antifriction bearing-roller 10, there being arranged within the cylinder on the rod 7 a normally expanded spring 11, disposed between the piston-head 9 and adjacent wall of the cylinder and against the action of which the piston moves during its instroke.

The cylinder 6 has at its inner end a pair of air-escape openings 12 and 13, of which the opening 12 communicates with a fixed pipe or duct 14, which is coupled at its outer end, as at 15, with the usual inflation-valve 16, carried by the tire 2, while the other opening 13 has disposed thereover a safety-valve 17, arranged for movement within a valve-casing 18, into the outer end of which is tapped an adjusting-nut 19, provided with a central air-escape opening 20 and between which and the valve 17 is disposed a spring 21 for normally pressing the valve to closed position.

Attached to one arm of the fork 4 is a member or clip 22, having pivoted thereto, as at 23, a cam member or disk 24, adapted to swing from a vertical position, as indicated by dotted lines in Fig. 1, to an inclined position, (indicated by full lines in said figure,) and when in the latter position for a portion of its surface to lie within the path of the bearing-roller 10.

For tipping the cam member or disk 24 on its pivot I employ an operating member or rod 25, arranged for rotation within bearings 26 27, attached to the adjacent arm of the fork 4 and provided at its upper end with a handpiece 28 and at its lower end with a right-angularly-disposed bearing portion or finger 29, adapted for engagement with a U-shaped bearing member or bracket 30, fixed upon the outer face of the disk 24, adjacent to the upper end of the vertical axis of the latter. The lower bearing 27 is preferably in the form of an L-shaped bracket riveted to the fork and having a pair of spaced ears which receive between them a ratchet-head 31, fixed upon the rod 25, one of said ears being provided with notches or seats 32, formed to receive a corresponding tooth or projection 33, provided on the adjacent face of the head 31, whereby the rod may be locked in its active or inactive position, there being arranged on the rod a normally expanded spring 34, which serves in practice to lift the rod bodily and maintain the tooth 33 in engagement with its seat 32.

In operation when it is desired to inflate the tire 2 the rod 25 is given a half-turn, thereby causing the angular portion or finger 29 to rock the member or disk 24 on its pivot and maintain the same in the full-line position illustrated in Fig. 1. The disk 24 being in this position and the hub 3 being under rotation during travel of the vehicle over the ground, the roller 10 will travel upon the face of the disk, and thereby reciprocate the piston 9 back and forth within the cylinder 6, as will be readily understood, it being obvious that the cylinder 6 rotates with the hub and that the outstroke of the piston is effected through the medium of the spring 11. As the piston is reciprocated air will be pumped through the duct 14 and valve 16 into the tire 2 for inflating the latter, and when the pressure within the tire becomes sufficiently great, or, that is, when the tire is fully inflated, the valve 17, which may be properly adjusted for the purpose, will automatically open and permit the air to escape therethrough, thus preventing bursting of the tire through undue pressure therein. The air escaping through the valve 17 will serve as an alarm to notify the operator that the tire is properly inflated, whereupon the rod 25 may be rotated for moving the arm 29 out of contact with the disk 24, thus permitting the latter, through the action of the piston 8, to move to its normal inactive position. (Indicated by dotted lines in Fig. 1.)

From the foregoing it is apparent that I produce a simple inexpensive device admirably adapted for the attainment of the ends in view, and one which will be wholly automatic in its operation, it being understood that minor changes in the details herein set forth may be resorted to without departing from the spirit of the invention. For instance, while I have herein illustrated the device as applied to the front wheel and fork of a bicycle it is apparent, of course, that the same may be applied to the rear wheel of a machine or to automobile or other vehicle wheels which are equipped with inflatable tires.

Having thus fully described the invention, what is claimed as new is—

1. The combination with a vehicle-wheel including a hub and an inflatable tire, of a pump-cylinder fixed for rotation with the wheel, a duct connecting the cylinder and tire for communication, a piston arranged for reciprocation within the cylinder and having its rod extended beyond one end of the latter, a pivoted cam member adapted to swing to an inclined position for acting upon the rod to reciprocate the piston, an operating-rod under control of the operator and having an angular portion adapted, when the rod is rotated, to move the cam member to active position, supporting-bearings for said rod, one of said bearings being provided with a notch, a head fixed upon the rod and having a tooth for engagement with the notch to lock the rod against rotation, and a spring acting upon the rod for maintaining the notch and tooth normally in locking engagement.

2. The combination with a vehicle-wheel including a hub and an inflatable tire, of a pump-cylinder fixed for rotation with the wheel, a duct communicating with the cylinder and tire, a guide-rod mounted in the cylinder, a piston arranged for reciprocation in the latter and having a tubular piston-rod in telescopic engagement with the guide-rod, a spring arranged on the guide-rod between the piston-head and adjacent end of the cylinder and adapted for moving the piston in one direction, the piston-rod being extended beyond the other end of the cylinder and equipped with a bearing-roller, a pivoted bearing-disk adapted to be moved to an inclined position and act upon the bearing-roller for reciprocating the piston against the action of the spring, and means under control of the operator for swinging the bearing-disk to active position.

In testimony whereof I affix my signature in presence of two witnesses.

FRANK BRUCKNER MERRY.

Witnesses:
WALTER A. CLARK,
B. W. BARROW.